United States Patent [19]
Van Vleet

[11] Patent Number: 5,975,553
[45] Date of Patent: Nov. 2, 1999

[54] HEIGHT ADJUSTABLE COUPLING DEVICE WITH VERTICAL CUSHIONING

[76] Inventor: Robert D. Van Vleet, 405 12th St., Sidney, Nebr. 69162

[21] Appl. No.: 08/861,992

[22] Filed: May 22, 1997

[51] Int. Cl.$^6$ ........................................................ B60D 1/50
[52] U.S. Cl. ........................ 280/483; 280/490.1; 280/511
[58] Field of Search ................................... 280/483, 484, 280/485, 490.1, 511; 267/140.3, 141.1

[56] References Cited

U.S. PATENT DOCUMENTS

| | | | |
|---|---|---|---|
| 2,150,269 | 3/1939 | Dreisbach | 280/483 |
| 2,287,234 | 6/1942 | Ducharme | 280/483 |
| 3,655,221 | 4/1972 | Warner | 280/490.1 |
| 3,708,183 | 1/1973 | Jones | 280/483 |
| 3,904,226 | 9/1975 | Smalley | 280/486 |
| 4,078,823 | 3/1978 | McBride | 280/490.1 |
| 4,148,498 | 4/1979 | Taylor, Jr. | 280/482 |
| 4,215,876 | 8/1980 | Jacks | 280/483 |
| 4,351,542 | 9/1982 | Lovell et al. | 280/489 |
| 4,662,647 | 5/1987 | Calvert | 280/490.1 |
| 4,746,138 | 5/1988 | James | 280/487 |
| 4,773,668 | 9/1988 | Muonro | 280/485 |
| 4,817,978 | 4/1989 | James | 280/487 |
| 4,978,133 | 12/1990 | Thorne et al. | 280/484 |
| 5,380,030 | 1/1995 | Gullickson | 280/486 |

FOREIGN PATENT DOCUMENTS

| | | | |
|---|---|---|---|
| 481968 | 3/1938 | United Kingdom | 280/484 |

*Primary Examiner*—Lanna Mai
*Assistant Examiner*—Michael Cuff
*Attorney, Agent, or Firm*—Greer, Burns & Crain, Ltd.

[57] ABSTRACT

An improved coupling device for connecting a towed vehicle and a towing vehicle, and includes a draw bar that is adapted to be affixed to the towing vehicle, a tube support structure connected to a distal end of the draw bar, and a tube that is movably connected to the tube support structure. Positioned within the tube are a slide bar, an upper cushion member, and a lower cushion member. The upper cushion member is seated within the tube adjacent to an upper axial end of the tube and the lower cushion member is seated within the tube adjacent to a lower axial end of the slide bar. The present invention also includes a connecting assembly that is affixed to a lower portion of the tube, where the connecting assembly consists of a connecting component configured and arranged to be removably attached to a corresponding connecting component on the towed vehicle. Further, the present coupling device preferably also includes a height adjustment assembly. The preferred embodiment of the height adjustment assembly consists of at least one set of aligned apertures on the tube support structure, located on opposite sides thereof; at least one set of aligned elongated slots on the tube, located on opposite sides thereof; and a plurality of apertures that extend through the slide bar. The tube support structure, the tube, and the slide bar are maintained at a selected height by a pin that is configured and arranged to be inserted through one set of aligned apertures on the tube support structure, one set of aligned elongated slots on the tube, and one of the plurality of apertures on the slide bar.

21 Claims, 2 Drawing Sheets

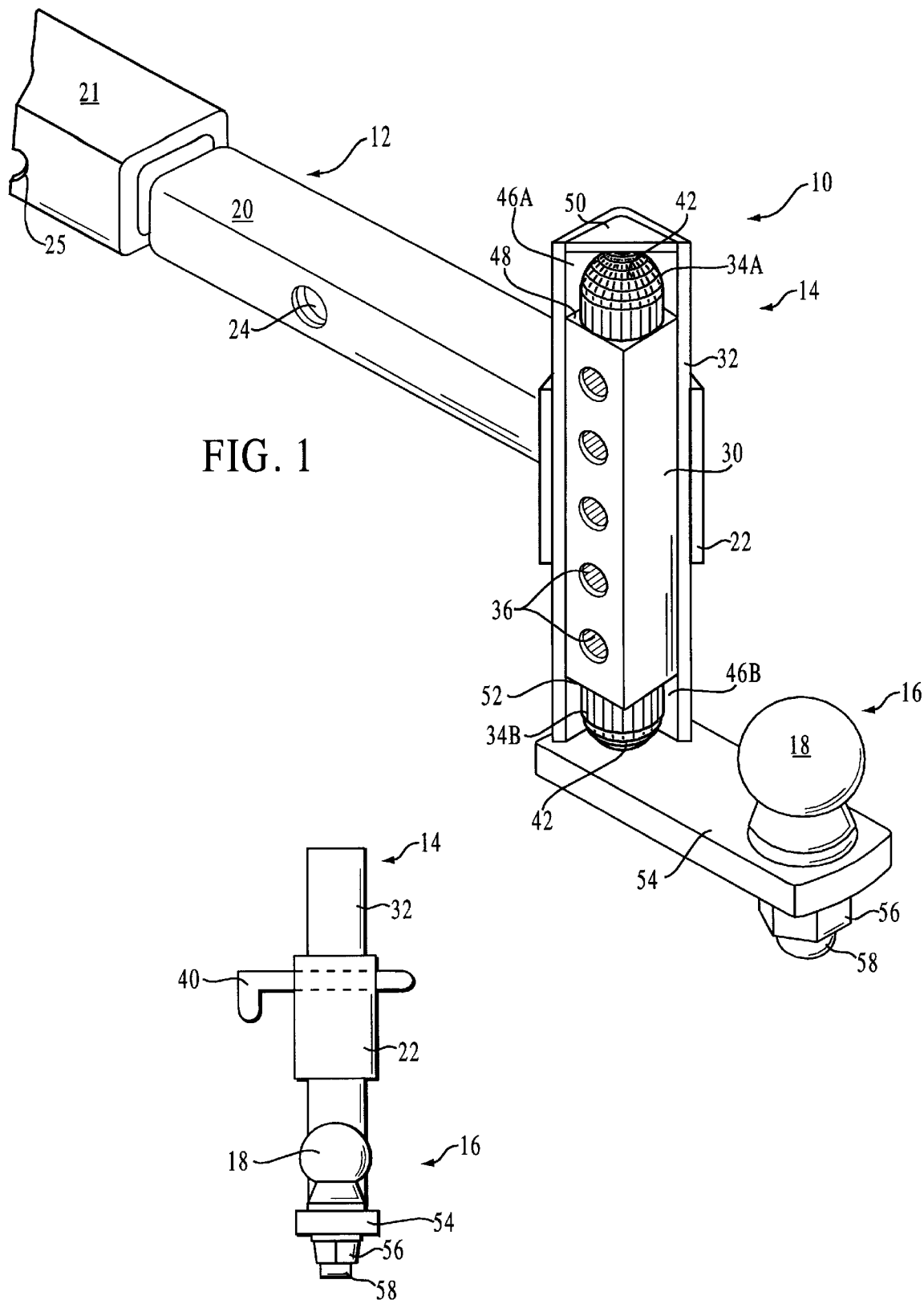

HEIGHT ADJUSTABLE COUPLING DEVICE WITH VERTICAL CUSHIONING

BACKGROUND

The present invention relates generally to an improved coupling device for connecting a towed vehicle, such as a trailer, with a towing vehicle, such as an automobile or truck. More particularly, the present invention relates to a coupling device that includes a cushion assembly for dampening shocks and vibrations in the vertical direction. Preferably, the present coupling device also includes an adjustment assembly for adjusting the height of a ball hitch connector so that the ball hitch connector can be placed at the appropriate level for towing a variety of different types of trailers.

One problem with many simple trailer hitch devices of the prior art is that they do not include any shock dampening mechanism. Without shock dampening, the forces and vibrations created by irregularities in the road surface, changes in acceleration, or a variety of other sources are freely transferred between the towing vehicle and the trailer. These shocks create undue wear and tear on the hitch assembly, and can also be felt as slight "jolts" by occupants of the towing vehicle.

In the prior art, there are currently two general types of coupling devices with some form of vertical cushioning—a first type in which the ball hitch connector is supported on a cushioning structure of an H-shaped configuration and a second type which includes only a single vertically-extending cushion assembly, but in which the connecting component (i.e., a ball hitch connector or a corresponding component such as a socket) is free to pivot about a pivot point. There are drawbacks to each of these two general types.

Examples of the first type of prior art coupling device (of the H-shaped configuration) are disclosed in U.S. Pat. No. 3,708,183 to Jones; U.S. Pat. No. 4,148,498 to Taylor, Jr.; and U.S. Pat. No. 4,215,876 to Jacks (hereinafter the Jones patent, the Taylor patent, and the Jacks patent, respectively). In both the Jones patent and the Taylor patent, the ball hitch connector is attached to a horizontally-extending beam that is supported on each of its edges by a vertically-extending cushioning structure. Thus, when these coupling devices of the first type are viewed from the rear of the towing vehicle, the horizontally-extending beam and the two vertically-extending cushioning structures define the previously mentioned H-shaped configuration. In both the Jones device and the Taylor device, the vertically-extending cushioning structures each include at least a pair of springs that sandwich and support the horizontally-extending beam.

The H-shaped configuration of the Jacks patent is defined by a horizontally-extending leaf spring, which is connected at its edges to two vertically-extending support strips. In the Jacks device, the ball hitch connector is seated on the center of the leaf spring, and each of the support strips includes a number of horizontally aligned holes that enable the vertical position of the ball hitch connector to be adjusted. While the ball hitch connector of the Jacks device is at least partially supported by the leaf spring, the primary means of maintaining the ball hitch connector in position is provided by a slider, upon which the ball hitch connector is affixed, and which is in turn seated within two vertical tracks that enable the slider to slide in the vertical direction.

While the prior art coupling devices with the H-shaped configuration do provide a level of vertical shock dampening, there are several drawbacks associated with these types of coupling devices. One drawback is that these prior art devices are somewhat complex assemblies formed from a relatively large number of parts. One reason for the large number of components is that each of these coupling devices requires a duplicate of each of the parts used in the vertically extending portion, in addition to the rest of the components required. The complexity of the assembly and the number of parts makes these prior art devices somewhat expensive. An additional factor adding to the overall cost of coupling devices of this type is the large number of components that need to be custom manufactured specifically for use in these devices.

Further, these prior art coupling devices are also quite large, and therefore necessitate the allotment of a substantial amount of space at the rear of the towing vehicle. Besides the unsightliness of such large devices, their large size may also contribute to reduced gas mileage from the added wind resistance and their excess weight.

The second type of coupling device with vertical energy dampening is exemplified by U.S. Pat. No. 4,351,542 to Lovell et al. In devices of this type, a horizontally extending "tongue" (upon which is seated the ball hitch connector or the associated socket) is pivotally attached to a bolt that extends horizontally through a housing at a right angle to the tongue. The tongue pivots with respect to the bolt, and is dampened by dampening members positioned above and below the tongue. Thus, the end of the tongue, which carries the ball hitch connector or socket, travels through an arcuate path during the dampening function.

One of the drawbacks associated with this second type of coupling device is related to the arcuate path of the ball hitch connector or socket member. This arcuate path creates unnecessary bending moments and stress concentrations on the tongue and at the area of connection between the ball hitch connector and the socket. Accordingly, these components are subject to undue wear at the points of contact. In addition, the bending moments may create force vectors that weaken the ball hitch connector, which could possibly lead to premature failure of this component.

Accordingly, in response to the drawbacks discussed above, a primary object of the present invention is to provide an improved coupling device for coupling a towing vehicle with a towed vehicle which eliminates the drawbacks of the prior art devices.

More specifically, one object of the present invention is to supply an improved coupling device of relatively simple, inexpensive construction that provides adequate energy dampening.

A related object of the present invention is to provide an improved energy dampening coupling device that may be manufactured in a cost effective manner by relying primarily upon components that can be produced from readily available stock materials, instead of requiring custom manufacture of specialized components.

An additional object of the present invention is to provide an energy dampening coupling device of an improved design that has a relatively small overall size.

A further object of the present invention is to supply an improved coupling device that does not require portions of the assembly to travel through an arcuate path, and therefore eliminates the unnecessary wear and stresses associated with such travel.

Yet another object of the present invention is to provide an improved energy dampening coupling device of simple construction that is adjustable to accommodate trailers of different heights.

These and other objects of the present invention will be apparent from the following description of the invention, while referring to the attached drawing figures in which:

FIG. 1 is a partially cut-away perspective view of an embodiment of the present coupling device;

FIG. 2 is an elevational front view of the present coupling device;

Figure 3:
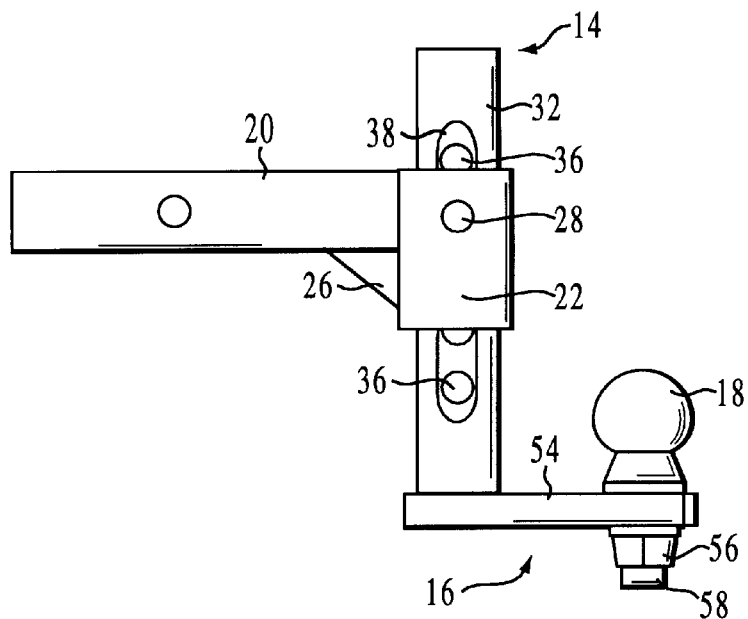
FIG. 3 is an elevational side view of the present coupling device, shown with the ball hitch connector located in a lower position.

The above-listed objects are met or exceeded by the present apparatus that provides an improved coupling device for connecting a towed vehicle (such as a trailer) with a towing vehicle (such as a truck or an automobile). Generally, in the preferred embodiment, the present invention is a coupling device that includes an energy dampening assembly that involves two cushion members seated within opposite ends of a vertically extending tube. Separating the two cushion members is a slide bar, which is also seated within the vertically extending tube. The slide bar is connected, through several other components, to the rear of the towing vehicle, and the cushion members serve to dampen the shocks that would otherwise be transferred between the towing vehicle and the towed vehicle.

More specifically, the preferred embodiment of the present invention is an improved coupling device for connecting a towed vehicle and a towing vehicle, and includes a draw bar that is adapted to be affixed to the towing vehicle, a tube support structure connected to a distal end of the draw bar, and a tube that is movably connected to the tube support structure. Positioned within the tube are a slide bar, an upper cushion member, and a lower cushion member. The upper cushion member is seated within the tube adjacent to an upper axial end of the tube and the lower cushion member is seated within the tube adjacent to a lower axial end of the slide bar. The present invention also includes a connecting assembly that is affixed to a lower portion of the tube, where the connecting assembly consists of a connecting component configured and arranged to be removably attached to a corresponding connecting component on the towed vehicle.

Further, the present coupling device preferably also includes a height adjustment assembly. The preferred embodiment of the height adjustment assembly consists of at least one set of aligned apertures on the tube support structure, located on opposite sides thereof; at least one set of aligned elongated slots on the tube, located on opposite sides thereof; and a plurality of apertures that extend through the slide bar. The tube support structure, the tube, and the slide bar are maintained at a selected height by a pin that is configured and arranged to be inserted through one set of aligned apertures on the tube support structure, one set of aligned elongated slots on the tube, and one of the plurality of apertures on the slide bar.

DETAILED DESCRIPTION OF THE PREFERRED EMBODIMENTS

Referring now to the drawings, the preferred embodiment of the present coupling device is shown in FIGS. 1–4, with FIG. 1 showing the present coupling device 10 in a partially cutaway perspective view. In the preferred embodiment, the coupling device 10 includes three main structural subassemblies: a receiver assembly 12, which is used to affix the coupling device to the towing vehicle; a main tube assembly 14; and a connecting assembly 16, which includes a component (such as a ball hitch connector 18) that can be connected to a corresponding component (such as a socket) on the trailer.

The receiver assembly 12 includes a horizontally extending draw bar 20 and a vertically extending tube support structure 22, which is configured to support the main tube assembly 14. The tube support structure 22 is connected to the distal end of the draw bar 20 by welding or otherwise rigidly affixing these two components together at approximately a right angle. Preferably, a brace 24 (as shown in FIG. 3) is used to provide extra strength to the connection between the draw bar 20 and the tube support member 22.

The present coupling device 10 may be secured to the rear of a truck or other suitable towing vehicle by inserting the draw bar 20 into a standard receiver member 21 that has been mounted onto the lower rear portion of the towing vehicle. The draw bar 20 and the receiver member 21 can be maintained in position by inserting a pin or a bolt through both aperture 24 and a similarly situated aperture 25 on the receiver member. While one example of a structure for connecting the coupling device with the towing vehicle has been shown and described, it is contemplated that other structures for connecting the coupling device with the towing vehicle may also be used. Further, it is also contemplated that the connecting assembly 16 may include the socket portion instead of the ball hitch connector 18.

For illustration purposes only, the tube support structure 22 shown in FIG. 1 is partially cutaway to reveal the components within the main tube assembly 14. However, as shown in the more complete views of FIGS. 2 and 3, the tube support structure 22 preferably consists of a vertically extending hollow tube of generally square cross-section. While a generally square cross-section is preferred because of the general availability of such tube stock, tube support structures of other cross-sections are also contemplated as being within the scope of the invention. However, when choosing alternate cross-sections, it should be kept in mind that the square cross-section was chosen, at least in part, because when combined with the generally square cross-section of the main tube assembly 14, relative rotation between the tube support structure 22 and the main tube assembly 14 is eliminated.

In accordance with one important aspect of the present invention, the tube support structure 22 includes an aperture 28 (shown in FIG. 3), which cooperates with several other components on the main tube assembly 14 to enable vertical adjustment of the main tube assembly 14. Adjustment of the main tube assembly 14 in the vertical direction facilitates the coupling of the ball hitch connector 18 with the corresponding socket (not shown) by enabling the ball hitch connector 18 to be lowered until it is aligned in the horizontal plane with the socket. Once the ball hitch connector 18 and the socket are aligned, the ball hitch connector 18 is raised until it is seated within the socket. The vertical adjustment feature of the present invention also permits the present coupling device 10 to be used with socket assemblies of differing heights. Thus, the present coupling device 10 is designed to be used with a variety of different sizes and types of trailers.

The vertical adjustment feature of the present invention is also associated with several components in the main tube assembly 14. As best shown in FIG. 1, a slide bar 30 is positioned within a main tube 32 between cushion members 34A and 34B. The slide bar 30 includes a plurality of adjustment apertures 36, which each extend completely through the slide bar 30 in the horizontal direction. Additional components of the vertical adjustment assembly can be seen in FIG. 3, which shows the main tube 32 including two vertically elongated slots 38 located on opposite sides thereof, although only one of those slots is visible in FIG. 3.

To maintain the main tube assembly 14 at a certain height, a securing pin 40 (shown in FIG. 2) is inserted through the apertures 28 in the tube support member 22, through the elongated slots 38 in the main tube 32, and through one of the apertures 36 in the slide bar 32. In this manner, the main tube assembly 14 is securely maintained at the desired height. Also, in order for the slide bar to be able to vertically move relative to the main tube 32, even when the pin 40 is positioned in either the uppermost or the lowermost aperture 36, the elongated slots 38 in the main tube 32 should extend at least slightly past the uppermost and lowermost apertures 36. Thus, vertical movement of the slide bar 30 within the main tube 32 will not be unduly restrained by the pin 40 abutting against the upper or lower edges of the elongated slots 38.

Figure 4:
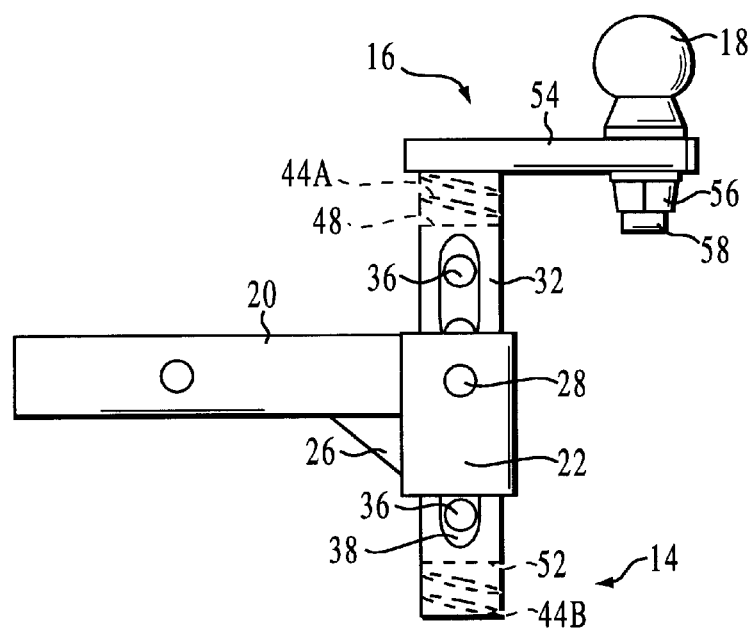
FIG. 4 is an elevational side view of the present coupling device, shown with the ball hitch connector located in an upper position.

If the desired height for the main tube assembly 14 is above that available when the pin 40 is placed in the lowermost aperture 36 that can communicate with aperture 28, the entire connecting assembly 16 and the main tube assembly 14 may be inverted as shown in FIG. 4. When the connecting assembly 16 and the main tube assembly 14 are inverted into the FIG. 4 configuration, the ball hitch connector 18 is located above the top of the main tube 32, instead of below the main tube 32, as is the case in the FIG. 3 configuration. In order for the ball hitch connector 18 to be directed upwardly after the main tube assembly 14 is inverted, the ball hitch connector 18 must be removed from the rest of the connecting assembly 16, turned upside down, and then re-secured to the rest of the connecting assembly 16 in this upside down state. Otherwise, if the ball hitch connector 18 is not turned upside down, it will be directed downwardly after the main tube assembly 14 is inverted.

In keeping with one of the principal objects of the present invention, the structure and operation of the cushion members 34A and 34B will now be described, while referring primarily to FIG. 1. As stated earlier, the cushion members 34A and 34B are seated within the main tube 32, with one cushion member positioned on either side of the slide bar 30. The upper cushion member 34A is seated within an upper expansion cavity 46A that is defined between the top surface 48 of the slide bar 30, the inner peripheral surfaces of the upper portion of the main tube 32, and an end plug 50, which is welded or otherwise affixed to the top of the main tube 32. The lower cushion member 34B is seated within a lower expansion cavity 46B that is defined between the lower surface 52 of the slide bar 30, the inner peripheral surfaces of the lower portion of the main tube 32, and an upper surface of a ball mount beam 54.

The two cushion members 34A and 34B are preferably preloaded under axial compression within their respective expansion cavities 46A and 46B. By preloading the cushion members 34A and 34B, the vertical slack between the slide bar 30 and the main tube 32 is reduced and any vertical forces can be dampened. Without sufficient preloading, there would be undue slippage between the slide bar 30 and the main tube 32, and adequate dampening during the initial stages of the forces and vibrations could not be achieved. It has been found in practice that a compressive preload of approximately 200 to 300 pounds is sufficient for most ordinary applications.

It should be noted that in the preferred embodiment, the slide bar 30 has been discussed as being a solid bar. Use of the solid bar of standard solid bar stock is an example of how readily available stock materials can be used to reduce manufacturing costs. However, it is contemplated that the slide bar 30 could be fabricated out of a hollow bar, and that end pieces could be welded to that bar to form the end surfaces 48 and 52. Some form of end surfaces 48 and 52 are necessary to create contact surfaces for the cushions 34A and 34B.

In the preferred embodiment, the cushion members 34A and 34B are preferably made of a material that is deformable, but not compressible. A natural rubber or other similar elastomeric material should be adequate for this purpose. However, it has been found that polyurethane, and more particularly polyurethane with a hardness within the range of about sixty eight (68) to about one hundred (100) durometer, and preferably of approximately eighty eight (88) durometer, is the material of choice for the cushion members 34A and 34B. This material has been found to have a very beneficial combination of necessary characteristics. Polyurethane of approximately eighty eight (88) durometer hardness has been found to deform at a slower rate than natural rubber. This relatively slow deformation rate provides superior dampening when compared to natural rubber. As an alternative to elastomeric or polyurethane cushion members 34A and 34B, springs 44A and 44B, shown in hidden lines in FIG. 4, may also be utilized.

Both of the cushion members 34A and 34B are preferably generally cylindrically shaped. It is also preferred that one end of each of the cushion members includes a hemispherical portion 42. Generally cylindrically shaped cushions with hemispherical ends are preferred because this shape allows the cushion members to be deformed under pressure in such a manner that they can take on the shapes of the expansion cavities 46 and 46B that they are seated within, which permits the optimal dampening effect. This preferred shape, which resembles a bullet, also results in a cushion member that requires increasing amounts of force to result in the deformation thereof.

However, while bullet-shaped cushions are preferred, it is contemplated that the cushion members 34A and 34B may be made in other shapes, such as simple cylindrical shapes with no hemispherical portion, and that these alternate shapes may also be successfully utilized with the instant invention. Although, it should be noted that if the preferred material is used for the cushion members 34A and 34B, i.e., if a deformable, non-compressible material is used, the cushion members 34A and 34B (or the expansion cavities 46A and 46B) need to be shaped with some form of recess, cavity, or air space to accommodate the surplus material once the deformation takes place. Otherwise, if a non-compressible material of the exact shape of the expansion cavity 46A or 46B is used, proper deformation, and thus proper dampening, will not take place. In the preferred embodiment with the hemispherical end portion 42, an air space into which the excess material may be deformed into is found around the outside of the hemispherical portion 42 within the expansion cavity 46A or 46B.

Moreover, it is also contemplated that alternate designs for the cushion means may be utilized in place of the two cushion members 34A and 34B discussed above. For example, it is contemplated that the slide bar 30 may be completely encased in a shock dampening material, with an additional layer of shock dampening material located at the axial ends thereof. With this form of the present invention, the additional benefit of some energy dampening in the lateral direction would also be obtained. It is also contemplated that the slide bar itself could be fabricated from a shock dampening material, if such a material of sufficient strength is available. If necessary, the slide bar fabricated from this shock dampening material could be reinforced near the apertures 36.

The components of the connecting assembly 16 will now be described, while referring to FIGS. 1–3. The connecting assembly 16 includes a generally horizontally extending ball mount beam 54, which includes a top surface near one end thereof upon which the bottom of the main tube 32 is welded or otherwise rigidly affixed. The ball hitch connector 18 is removably affixed (such as with a nut 56 mounted onto a threaded shaft 58) to an area near the opposite end of the ball mount beam 54. The use of a nut 56, or other easily removable affixing member, is preferred because it facilitates removal of the ball hitch connector 18 from the ball mount beam 54 when it is necessary to invert the ball hitch connector 18 prior to use of the device in the configuration shown in FIG. 4. Although the drawing figures and the previous discussion have related to the use of a ball hitch connector as the connecting component, it is contemplated that a socket, or even another form of connector, may be located on the mount beam 54.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A coupling device for connecting a towed vehicle and a towing vehicle, said coupling device comprising:
    a draw bar adapted to be affixed to the towing vehicle, said draw bar having a tube support structure at an outer end portion thereof;
    a generally vertically moveable tube at least partially located within said tube support structure;
    a slide bar positioned within said tube and being moveable relative to said tube, said slide bar being adapted to be vertically adjusted relative to said tube support structure;
    means for releasably attaching both said slide bar and said tube to said tube support structure;
    means associated with said slide bar and said tube for biasing said tube against vertical movement relative to said slide bar, said biasing means permitting limited vertical movement and thereby providing a cushioning effect for said tube relative to said draw bar;
    a connecting assembly affixed to a lower portion of said tube, said connecting assembly including a connecting component configured and arranged to be removably attached to a corresponding connecting component on the towed vehicle.

2. The coupling device as defined in claim 1 wherein said means for releasably attaching both said slide bar and said tube to said tube support structure includes an adjustment assembly comprising:
    at least one set of aligned apertures on said tube support structure, located on opposite sides thereof;
    at least one set of aligned elongated slots on said tube, located on opposite sides thereof;
    a plurality of apertures extending through said slide bar; and
    a pin that is configured and arranged to be inserted through one set of said aligned apertures on said tube support structure, one set of said aligned elongated slots on said tube, and one of said plurality of apertures on said slide bar.

3. The coupling device as defined in claim 1 wherein said biasing means includes:
    an upper cushion member seated within said tube adjacent an upper end of said slide bar; and
    a lower cushion member seated within said tube adjacent a lower end of said slide bar.

4. The coupling device as defined in claim 3 further comprising:
    a ball mount beam affixed to a lower portion of said tube, said ball mount beam including an upper surface and a lower surface;
    an upper expansion cavity for seating said upper cushion member, said upper expansion cavity defined by an end plug affixed to an upper portion of said tube, an inner circumferential surface on an upper portion of said tube, and said upper end of said slide bar;
    a lower expansion cavity for seating said lower cushion member, said lower expansion cavity defined by said lower end of said slide bar, an inner circumferential surface on said lower portion of said tube, and said upper surface of said ball mount beam; and
    wherein said upper cushion member and said lower cushion member are each generally bullet-shaped with a generally hemispherical portion on one end thereof and a generally cylindrical portion on another end thereof.

5. A coupling device for connecting a towed vehicle and a towing vehicle, said coupling device comprising:
    a draw bar adapted to be affixed to the towing vehicle;
    a tube support structure that is rigidly connected to one end portion of said draw bar;
    a tube movably connected to said tube support structure;
    a slide bar positioned within said tube, said slide bar having an upper end and a lower end;
    an upper cushion member seated within said tube adjacent said upper end of said slide bar;
    a lower cushion member seated within said tube adjacent said lower end of said slide bar; and
    a connecting assembly affixed to a lower portion of said tube, said connecting assembly including a connecting component configured and arranged to be removably attached to a corresponding connecting component on the towed vehicle.

6. The coupling device as defined in claim 5 wherein said tube is movably connected to said tube support structure via an adjustment assembly, further wherein said adjustment assembly comprises:
    at least one set of aligned apertures on said tube support structure, located on opposite sides thereof;
    at least one set of aligned elongated slots on said tube, located on opposite sides thereof;
    at least one aperture extending through said slide bar; and
    a pin that is configured and arranged to be inserted through one set of said aligned apertures on said tube support structure, one set of said aligned elongated slots on said tube, and one of said at least one aperture on said slide bar.

7. The coupling device as defined in claim 5 wherein said upper cushion member and said lower cushion member are each generally bullet-shaped with a generally hemispherical portion on one end thereof and a generally cylindrical portion on another end thereof.

8. The coupling device as defined in claim 5 wherein said upper cushion member and said lower cushion member are each preloaded under compression in an axial direction.

9. The coupling device as defined in claim 5 wherein said upper cushion member and said lower cushion member each comprise a spring.

10. The coupling device as defined in claim 5 wherein said upper cushion member and said lower cushion member are each fabricated from a polyurethane material.

11. The coupling device as defined in claim 5 wherein:

said tube support structure is a hollow tube of generally square-shaped cross-section;

said tube has a generally square-shaped cross section of an outer circumference that is slightly less than an inner circumference of said generally square-shaped cross-section of said tube support structure so that said tube may be seated within said tube support structure; and said slide bar is a substantially solid tube of generally square-shaped crosssection of an outer circumference that is slightly less than an inner circumference of said tube so that said slide bar may be seated within said tube.

12. The coupling device as defined in claim 5 wherein said connecting assembly comprises:

said connecting component being defined by a ball hitch connector, which is configured and arranged to be engaged with said corresponding connecting component on said towed vehicle;

a ball mount beam with one end affixed to a lower portion of said tube and another end affixed to said ball hitch connector.

13. The coupling device as defined in claim 5 wherein said slide bar is configured and arranged to be maintained in a fixed position relative to said tube support structure.

14. A ball hitch mounting device comprising:

a ball hitch connector, said ball hitch connector being configured and arranged to be removably attached to a corresponding connector on a towed vehicle;

a ball mount beam affixed to said ball hitch connector, said ball mount beam including an upper surface and a lower surface;

a main tube affixed to said upper surface of said ball mount beam;

a slide bar positioned within said main tube;

a receiver assembly adapted for affixing said ball hitch mounting device to the towing vehicle, said receiver assembly including a tube support structure for supporting said main tube; and a cushion assembly positioned within said main tube, said cushion assembly being configured and arranged to dampen shocks transferred from the towing vehicle through said receiver assembly to said slide bar;

wherein said slide bar is configured and arranged to be maintained in a fixed position relative to said tube support structure.

15. The ball hitch mounting device as defined in claim 14 wherein said main tube is movably connected to said receiver assembly via an adjustment assembly, said adjustment assembly for enabling vertical adjustment, and including:

said tube support structure being defined by a generally vertically extending tube configured to surround at least a portion of said main tube;

at least one set of aligned apertures on said tube support structure, located on opposite sides thereof;

at least one set of aligned elongated slots on said main tube, located on opposite sides thereof;

a plurality of apertures extending through said slide bar; and a pin that is configured and arranged to be inserted through one set of said aligned apertures on said tube support structure, one set of said aligned elongated slots on said main tube, and one of said plurality of apertures on said slide bar.

16. The ball hitch mounting device as defined in claim 14 wherein said cushion assembly includes:

an upper cushion member seated within said main tube adjacent an upper axial end of said slide bar; and a lower cushion member seated within said main tube adjacent a lower axial end of said slide bar.

17. The ball hitch mounting device as defined in claim 16 wherein:

said upper cushion member and said lower cushion member are each generally bullet-shaped with a generally hemispherical portion on one end thereof and a generally cylindrical portion on another end thereof; and further wherein said upper cushion member and said lower cushion member are each fabricated from a polyurethane material and are each preloaded under compression in an axial direction.

18. The ball hitch mounting device as defined in claim 16 wherein said upper cushion member and said lower cushion member each comprise a spring.

19. The ball hitch mounting device as defined in claim 16 further comprising:

an upper expansion cavity for seating said upper cushion member, said upper expansion cavity defined by an end plug affixed to an upper portion of said main tube, an inner circumferential surface on an upper portion of said main tube, and said upper axial end of said slide bar; and a lower expansion cavity for seating said lower cushion member, said lower expansion cavity defined by said lower axial end of said slide bar, an inner circumferential surface on said lower portion of said main tube, and said upper surface of said ball mount beam.

20. The ball hitch mounting device as defined in claim 14 wherein:

said tube support structure includes a hollow tube of generally square-shaped cross-section;

said main tube has a generally square-shaped cross section of an outer circumference that is slightly less than an inner circumference of said generally square-shaped cross-section of said tube support structure so that said main tube may be seated within said tube support structure; and said slide bar is a substantially solid tube of generally square-shaped cross-section of an outer circumference that is slightly less than an inner circumference of said main tube so that said slide bar may be seated within said main tube.

21. A coupling device for connecting a towed vehicle and a towing vehicle, said coupling device comprising:

a draw bar adapted to be affixed to the towing vehicle;

a tube support structure connected to one end portion of said draw bar;

a tube movably connected to said tube support structure;

a slide bar positioned within said tube, said slide bar having an upper end and a lower end;

an upper cushion member seated within said tube adjacent said upper end of said slide bar;

a lower cushion member seated within said tube adjacent said lower end of said slide bar; and a connecting assembly affixed to a lower portion of said tube, said connecting assembly including a connecting component configured and arranged to be removably attached to a corresponding connecting component on the towed vehicle a ball mount beam affixed to a lower portion of said tube, said ball mount beam including an upper surface and a lower surface;

an upper expansion cavity for seating said upper cushion member, said upper expansion cavity defined by an end plug affixed to an upper portion of said tube, an inner circumferential surface on an upper portion of said tube, and said upper end of said slide bar; and a lower expansion cavity for seating said lower cushion member, said lower expansion cavity defined by said lower end of said slide bar, an inner circumferential surface on said lower portion of said tube, and said upper surface of said ball mount beam.

* * * * *